D. O. ROYSTER.
COMBINED MOTION PICTURE APPARATUS AND PHONOGRAPH.
APPLICATION FILED JULY 15, 1912.

1,252,304.

Patented Jan. 1, 1918.
5 SHEETS—SHEET 1.

Witnesses

Inventor
David O. Royster

D. O. ROYSTER.
COMBINED MOTION PICTURE APPARATUS AND PHONOGRAPH.
APPLICATION FILED JULY 15, 1912.

1,252,304.

Patented Jan. 1, 1918.
5 SHEETS—SHEET 4.

UNITED STATES PATENT OFFICE.

DAVID O. ROYSTER, OF ST. LOUIS, MISSOURI.

COMBINED MOTION-PICTURE APPARATUS AND PHONOGRAPH.

1,252,304.  Specification of Letters Patent.  Patented Jan. 1, 1918.

Application filed July 15, 1912.  Serial No. 709,399.

*To all whom it may concern:*

Be it known that I, DAVID O. ROYSTER, a citizen of the United States, residing in the city of St. Louis and State of Missouri, have invented certain new and useful Improvements in Combined Motion - Picture Apparatus and Phonographs, of which the following is a full, clear, and exact description, reference being had to the accompanying drawings, forming a part hereof.

My invention relates to a new and useful machine or apparatus for the simultaneous and synchronous display of motion pictures and reproduction of sounds, thereby making the motion pictures much more realistic than when displayed in the ordinary manner.

In the following description the term phonograph is used in its broadest sense, being intended to designate a suitable mechanism particularly adapted for reproducing sounds from a record.

The principal objects of my invention are, first, to provide a simple apparatus combining a phonograph and a motion picture machine which can be operated with comparatively little power, second, to provide simple means in the form of readily detachable clutches or connecting devices between the motor and the phonograph and picture machine, whereby the two machines can be simultaneously operated in synchronism, or independently, as desired, third, to provide means whereby the two machines can be operated singly or together, either by hand power or by a suitable motor, fourth, to provide means for effectually protecting the film used in the motion picture machine so as to reduce to a minimum the danger of fire, fifth, to provide simple means for protecting the film as it is transferred from one reel to the other, and preventing the body of said film from being scratched and its edges broken or cracked, sixth, to provide simple means for vertically adjusting the film and film carrying rollers with respect to the barrel in which the projecting lens is located, and, seventh, to provide means whereby the reproduced sounds can be carried or transmitted to a reproducing apparatus located to the rear of the screen upon which the pictures are thrown.

To the above purposes my invention consists in certain novel features of construction and arrangement of parts hereinafter more fully described, claimed and shown in the accompanying drawings, in which—

Referring by numerals to the accompanying drawings, 1 designates a bed or baseplate, and located thereon is a rectangular frame 2 which forms a support for the phonograph and its operating mechanism. Located in the left hand of this frame is a transverse rail 3 provided with bearings 4. The right hand end wall of the frame is provided with two hinged or removable sections 5, and formed on the inner faces thereof are conical bearing points 6 which are in alinement with the bearings 4. Cylindrical members 7 are adapted to carry removable sound records 8, preferably in the form of wax cylinders, and projecting from the left hand ends of these members 7 are short shafts 9, which operate in the bearings 4 and in corresponding bearings in the left hand end wall of the frame 2. Short pintles 10 project from the right hand ends of the members 7, said pintles being provided with recesses adapted to be engaged by the conical bearing points 6.

When the removable sections 5 are detached or swung outwardly, the sound records 8 are free to be removed from the members 7. A pair of parallel longitudinally extending rails 11 are located in the center of the frame 2, and arranged outside and immediately adjacent to these rails are longitudinally extending threaded shafts 12, the ends of which are journaled for rotation in suitable bearings in the transverse rail 3 and in the right hand end wall of the frame 2.

Fixed on the ends of one of these shafts 12, are pinions 13, and meshing therewith are larger pinions 14, which latter are mounted on studs seated in the bar 3 and right hand end wall of the frame 2, and each of said pinions carries an arm 15. A vertically disposed tube 16 is adapted to move lengthwise between the rails 11 and carried by and arranged on opposite sides of this tube are pairs of rollers 17 that bear on the upper and lower edges of said rails. Projecting from this tube is a stud 18 on which is loosely mounted a dog 19 provided in its ends with notches 20, the surfaces of which are provided with teeth adapted to engage the threads of the shafts 12. Loosely mounted on the tube 16 is a short tube 21 having a horizontal tubular extension 22 that carries a sound reproducing member 23 of any well known construction, the needle of which is adapted to engage the record cylinders 8. The tube 16 is provided with a pair of oppositely arranged apertures 24 with which the inner open end of the tubular extension 22 is adapted to engage.

Figures 6, 8, 9:
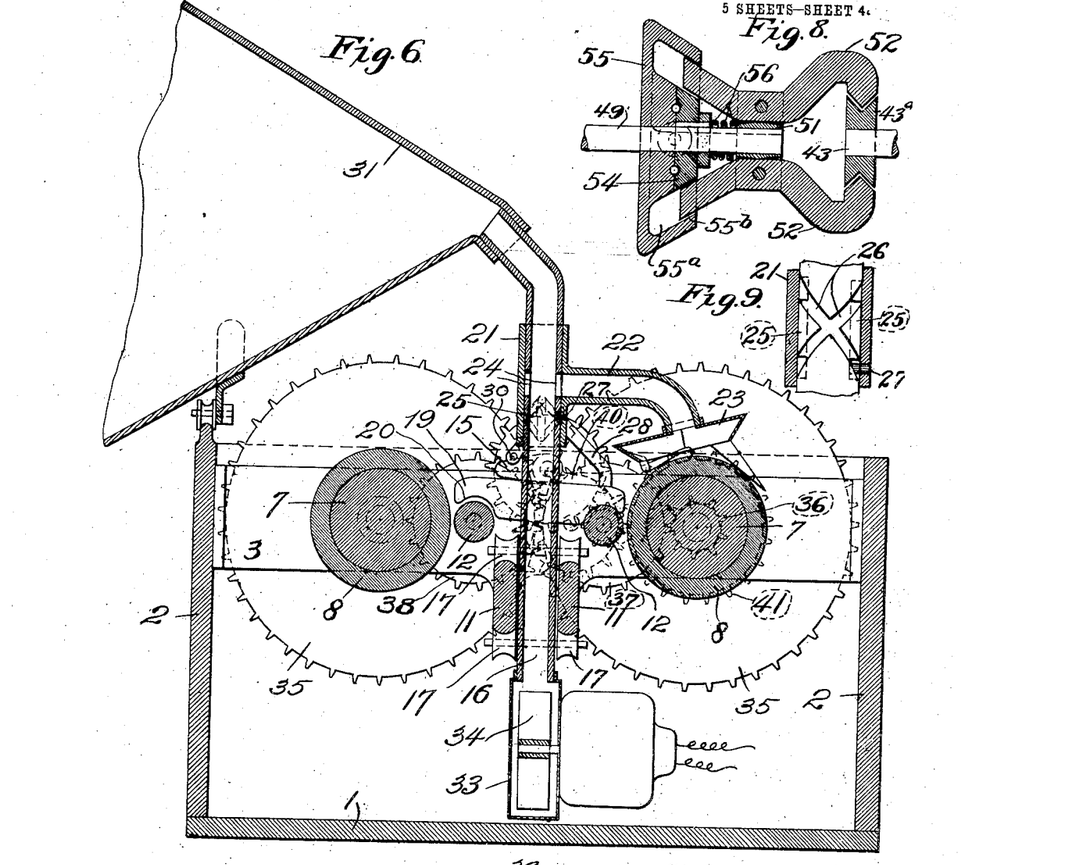
Fig. 6 is an enlarged cross-section taken on the line 6—6 of Fig. 1.
Fig. 8 is an enlarged vertical section taken approximately on the line 8—8 of Fig. 1.
Fig. 9 is a detail elevation of a portion of a tube that carries the sound reproducer, and showing the grooves therein which are instrumental in effecting a swinging or shifting movement of the reproducer.

Formed in the surface of the tube 16 is an oppositely arranged pair of vertical grooves 25 and connecting the ends thereof are oppositely disposed pairs of spirally arranged grooves 26. Seated in the tube 21 is a pin 27 that engages in the grooves 25 and operates through the grooves 26 as the reproducer is shifted from one record to the other. Fixed to and projecting outwardly and downwardly from the tube 21 is a pair of arms 28, the ends of which are adapted to engage upon the ends of the dog 19, to hold the same in engagement with the shafts 12. As the tube 21 carrying the arms 28 is reversed in position, each of said arms alternately engages the opposite ends of the dog to cause the toothed surfaces to alternately engage the threaded shafts.

Carried by the tube 21 on the side opposite from the arms 28 is a laterally projecting bracket 29, provided with a pin 30, so positioned as to be engaged by the arms 15 carried by the pinions 14.

The upper end of the tube is bent slightly and is adapted to receive an amplifying horn 31 or a suitable telephone transmitter 32. Carried by the lower end of the tube 16 is a housing 33 in which operates a small fan 34, driven by a motor attached to said housing and receiving current from a suitable source. This fan is for the purpose of forcing the sound waves out of the tube 16, and into the horn or transmitter carried thereby.

Figure 7:
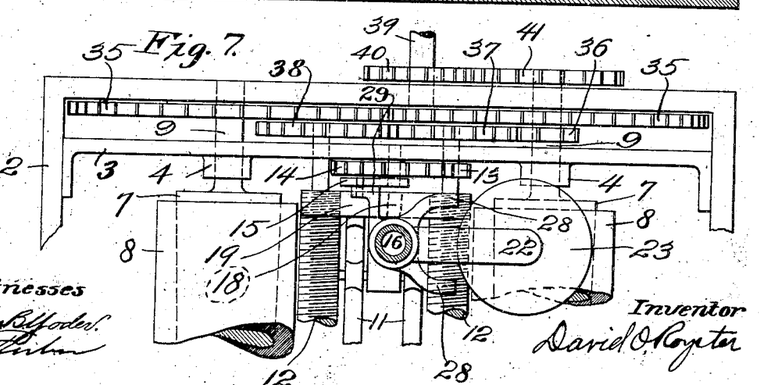
Fig. 7 is an enlarged plan view of the end of the frame of the phonograph, showing the driving connections between the two record carrying shafts and the automatically reversing reproducer.

Fixed on the shafts 9 adjacent to the right hand end wall of the frame 2 are meshing gear wheels 35, and fixed on one of said shafts 9 is a small pinion 36, that meshes with a larger pinion 37, which latter is fixed on the end of the adjacent shaft 12 and meshes with a corresponding pinion 38 fixed on the other one of said shafts 12. The pinion 37 is mounted on the same shaft 12 that carries the pinions 13. Journaled for rotation in the left hand end wall of the frame 2 is one end of a shaft 39, carrying a pinion 40, and meshing therewith is a pinion 41 that is fixed on the end of the shaft 9 that carries the pinion 36.

Figures 3, 4, 5:
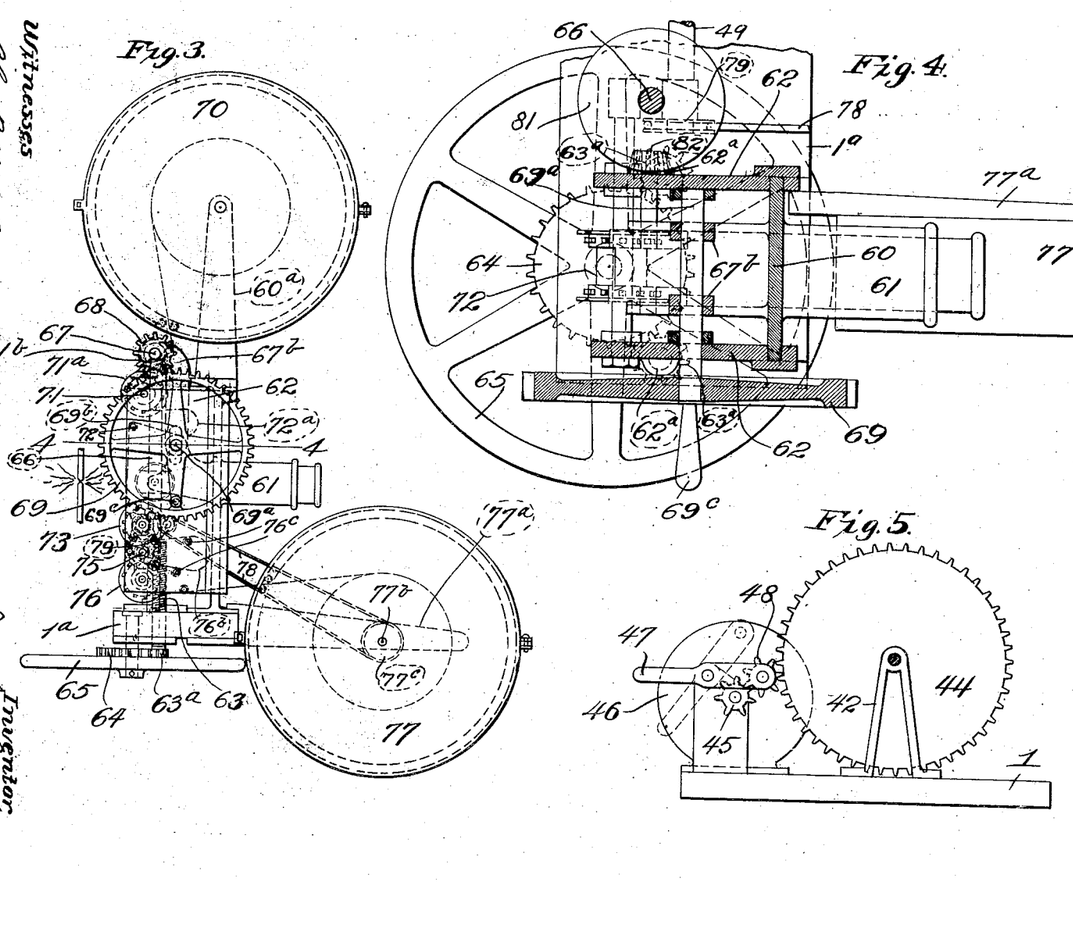
Fig. 3 is an elevation of the motion picture machine, said elevation being taken as looking in the direction indicated by the arrow 3 in Fig. 1.
Fig. 4 is an enlarged horizontal section taken approximately on the line 4—4 of Fig. 3.
Fig. 5 is an elevation of the parts seen looking in the direction indicated by the arrow 5, Fig. 1, and showing the connections from the motor to the main driving shaft of the appaartus.

Journaled in suitable bearings 42 to the left of the shaft 39 is a short shaft 43 and fixed on the ends thereof are grooved pulleys 43$^a$ and 43$^b$. This shaft carries a gear wheel 44, and arranged adjacent thereto and in alinement therewith is a pinion 45, that is carried by the main shaft of a suitable motor 46. Journaled for rotation upon the end of a fulcrumed hand lever 47 is a pinion 48 that is adapted to form a driving connection between the pinion 45 and gear wheel 44. The shaft 43 is in direct alinement with the shaft 39 and arranged immediately to the left of said shaft 43 and in alinement therewith is a shaft 49 that is journaled in a suitable bearing 50. The shaft 43 is the motor driven shaft and to impart rotary motion therefrom to the shafts 39 and 49 I employ a pair of clutches that are identical in construction and operation.

One of these clutches is illustrated in Fig. 8, its construction being as follows: Fixed on the end of the shaft 49 is a slotted collar 51, and pivotally carried thereby is an oppositely arranged pair of levers 52, the outer ends of which are formed to engage in the grooved pulley 43ª. Arranged to slide lengthwise on a key or feather seated in the shaft 49 is a disk 54 having a beveled edge adapted to bear against the inner faces of the ends of the levers 52 opposite the ends that engage the pulley. Loosely mounted on the shaft 49 immediately to the rear of the disk 54 is a larger disk 55 provided with recesses 55ª that receive the ends of the levers 52. The edges 55ᵇ at the outer ends of the recesses are adapted to bear against the outer faces of the ends of the levers. Ball bearings are located between the adjacent faces of the disks 54 and 55 and located on the shaft 49 between the collar 51 and the disk 54 is a compression spring 56 that tends to force the disk 54 away from between the ends of the levers 52. The disk 55 is inclosed by a yoke 57, the same being carried by a hand lever 58 which latter is pivoted on the base 1 and is provided with a suitable segment and locking pawl whereby it may be locked to hold the disk 54 between the ends of the levers 52. When thus held locked the grooved pulley is engaged by the outer ends of the levers 52, thereby locking the shafts 43 and 49 so that they will rotate simultaneously. The shaft 39 is equipped with a clutch identically like the one just described, and this last mentioned clutch is operated by means of a hand lever 58ª for locking the shafts 43 and 39 to each other so that they will rotate simultaneously.

Projecting from the left hand end of the base 1 is an extension 1ª on which the motion picture machine of my improved apparatus is mounted. This mechanism comprises an upright plate 60, the bottom of which is fixed to the base, and said plate carries the barrel 61 in which the projecting lenses are located. Arranged to slide vertically on the plate 60 is a vertically disposed frame work comprising a pair of side plates 62 which form supports for the various film carrying rollers.

Formed on the lower portions of these plates 62 are vertically disposed lugs 62ª, in which are seated the threaded upper ends of screw shafts 63, which latter are journaled in the base 1ª and carry on their lower ends pinions 63ª. These pinions mesh with a large gear wheel 64, carried by a hand wheel 65, which latter is journaled on a suitable stud depending from the base 1ª.

This mechanism provides means for raising or lowering the position of the film with respect to the projecting lenses in the barrel 61.

Positioned immediately to the left hand of the bearing 50 is a vertically disposed threaded shaft 66, and carried by the upper end thereof is a beveled pinion 66ª, which meshes with a corresponding pinion 66ᵇ, carried by the end of a shaft 67. This shaft is journaled in suitable bearings 67ª, on the upper ends of brackets 67ᵇ, which latter project upward from the barrel 61.

A collar 67ᶜ is adjustably arranged on the shaft 67 by means of a set screw and when said set screw is loosened to release the collar, the shaft 67 can be shifted toward the left to disengage the pinion 66ᵇ from the pinion 66ª. Fixed on the left hand end of the shaft 67 is a pinion 68, that is adapted to mesh with a gear wheel 69, carried on the end of a shaft 69ª, which latter passes through slots 69ᵇ in the plates 62 and operates in bearings formed in the brackets 67ᵇ. The gear wheel 69 is provided with an operating handle 69ᶜ which is manually engaged when the motion picture machine is to be operated by hand.

Fixed to the upper end of the plate 60 is a bracket 60ª, and positioned thereon is a reel housing 70 that is adapted to receive the reel of film that is to be passed through the motion picture machine.

Journaled for rotation in suitable bearings in the upper ends of the plates 62 is a film carrying roller 71 provided with the usual projections near its ends, which projections enter the usual apertures formed in the sides of the film—and located on the ends of this roller are comparatively wide flanges 71ª which serve as a protection for the edges of the film to prevent the same from being scratched or broken. Located immediately above this roller is a small roller 71ᵇ which serves to guide the film onto said roller 71. One end of the shaft that carries the roller 71 is extended and carries a worm 71ᶜ that meshes with the shaft 66.

Located below the roller 71 is a small roller 72 and the film is extended laterally to form a free loop, as designated by 72ª between the rollers 71 and 72. From the roller 72 the film passes downward behind the rear end of the barrel 61 onto a second film supporting roller 73 provided with projections and end flanges in every way similar to those on the roller 71, and said roller 73 is mounted for rotation in suitable bearings in the plates 62. Fixed on the shaft of this roller 73 is a disk 74 having a series of concave notches 74ª in its edge and said disk carries a mutilated pinion 74ᵇ.

Journaled in the plates 62 below the roller 73 is a shaft 75 carrying a disk 75ª provided in its edge with notches 75ᵇ, and the portions of this disk between said notches are adapted to bear against the surfaces of the notches 74ª in the disk 74.

Carried by the disk 75 is a mutilated gear wheel 75ᶜ, the teeth of which engage with the teeth of the mutilated pinion 74ᵇ. Fixed on the end of the shaft 75 is a worm 75ᵈ that meshes with the shaft 66.

The arrangement just described provides means for imparting intermittent movement to the film. Arranged for rotation below the shaft 75 is a third film carrying roller 76 provided with projections and end flanges, in every way similar to those on the rollers 71 and 73. Fixed on the shaft that carries this roller 76 is a worm 76ª that meshes with the shaft 66. The film is extended laterally to form a loose loop 76ᵇ between the rollers 73 and 76, which loop is supported at suitable points by small rollers 76ᶜ.

From the roller 76 the film passes into a reel housing 77 that is carried by a suitable bracket 77ª projecting from the base 1ª. Arranged within this housing is a shaft 77ᵇ adapted to receive the reel onto which the film is to be wound after passing through the machine, and fixed on said shaft is an ordinary slip pulley 77ᶜ which receives a belt 78, which latter operates on a pulley 79 carried by the left hand end of the shaft 49. Fixed on this shaft 49 adjacent to the pulley 79 is a worm 80 that meshes with the screw threaded shaft 66.

Fixed on the shaft 66 near its center is a beveled gear wheel 81 that meshes with a pinion 82 carried by the end of a shaft 83, which latter is mounted in suitable bearings in the plates 62 and extends through the rear end of the barrel and carries a suitable shutter (not shown).

Figure 10:
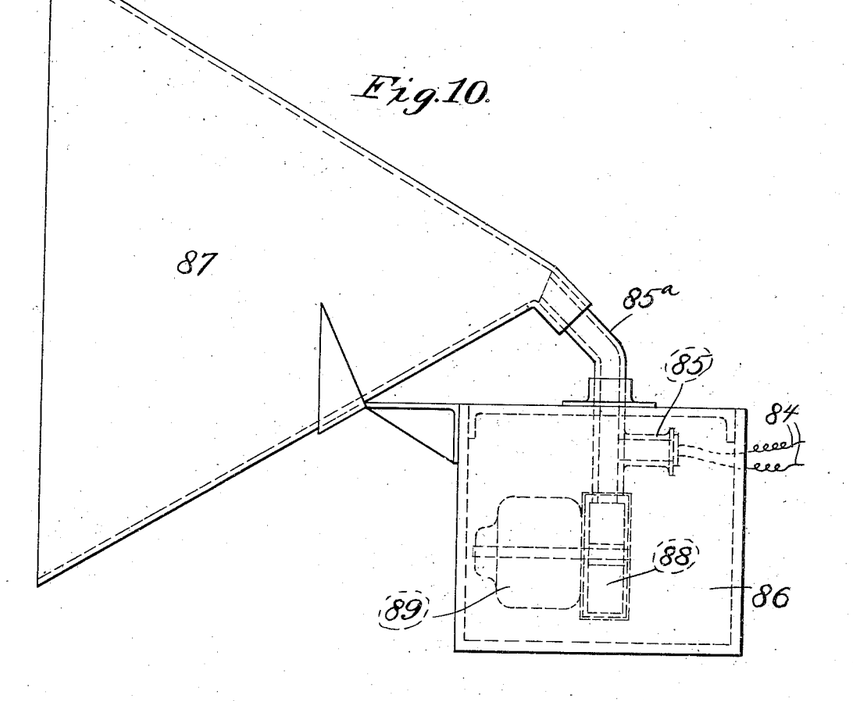
Fig. 10 is an elevation of the amplifying horn utilized in connection with my approved apparatus when the reproduced sounds are transmitted to the rear side of the screen on which the pictures are shown.

In order to telephone or transmit the sounds produced from the records 8 to a point back of the screen on which the pictures are shown, ordinary telephone conducting wires 84 lead from the transmitter 32 to a telephone receiver 85 located in a box or housing 86 positioned behind the screen and leading from this receiver is a tube 85ª to which is connected an amplifying horn 87.

Located at the lower end of the tube 85ᵈ is a fan 88. This fan operates within a suitable housing and is driven by a small motor 89 that is mounted on said housing. Thus means are provided for driving all the sound waves from the receiver 85 through the tube 85ª and into the horn 85.

The operation of my improved apparatus is as follows: Assuming that it is desired to drive the motion picture machine and phonograph synchronously and from the motor 46, the hand levers 58 are shifted toward each other to move the members 55 and disks 54 upon their respective shafts, thereby engaging the rear ends of the pairs of levers 42, rocking the same upon their pivot points and clamping their forward ends upon the pulleys 43ª and 43ᵇ. Thus the levers perform the function of clutches and lock the shafts 39 and 49 to the shaft 43. This shaft is driven from the motor 46 by the train of gearing 45, 48 and 44.

The rotary motion of the shaft 39 is transmitted to the shafts 9 by the pinions 40 and 41, and pair of meshing gear wheels 35.

Rotary motion from one of the shafts 9 is transmitted to the threaded shafts 12 by means of the meshing pinions 36, 37, and 38. The pinions 14 carrying the arms 15 are driven from one of the shafts 12 by the pinions 13.

Figure 1:
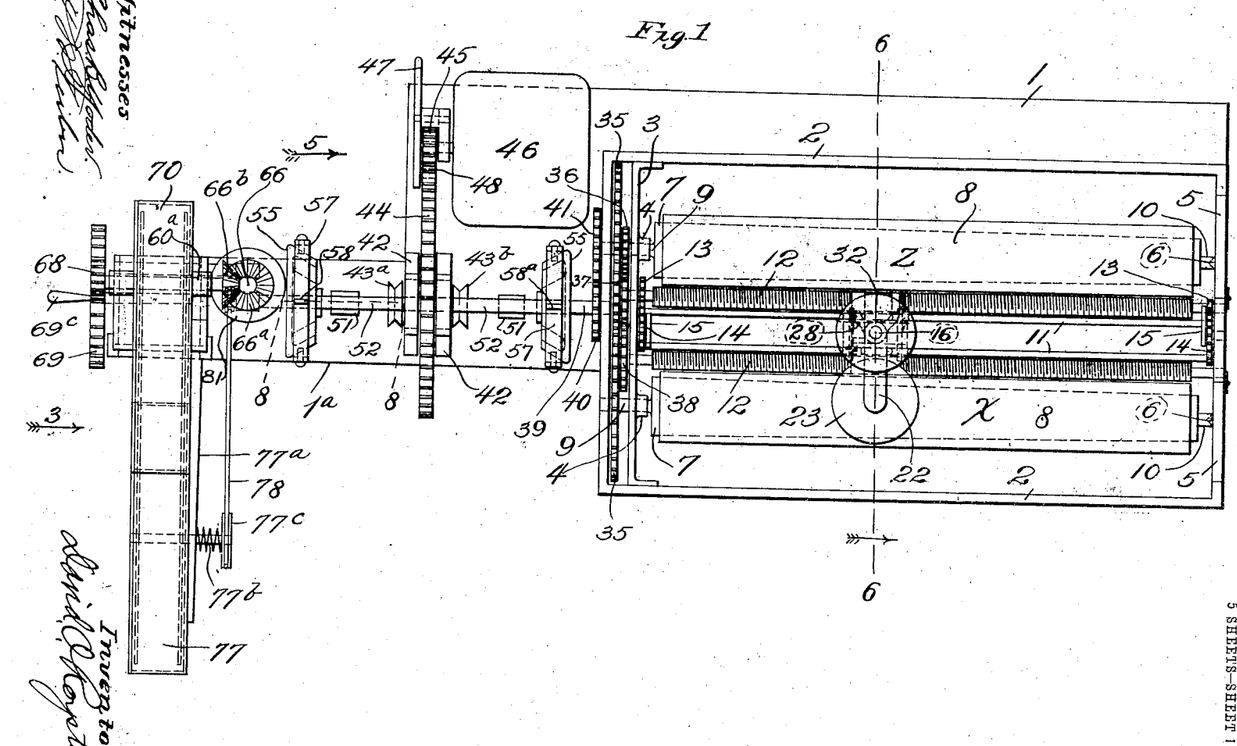
Figure 1 is a plan view of an apparatus of my improved construction.
Figure 2:
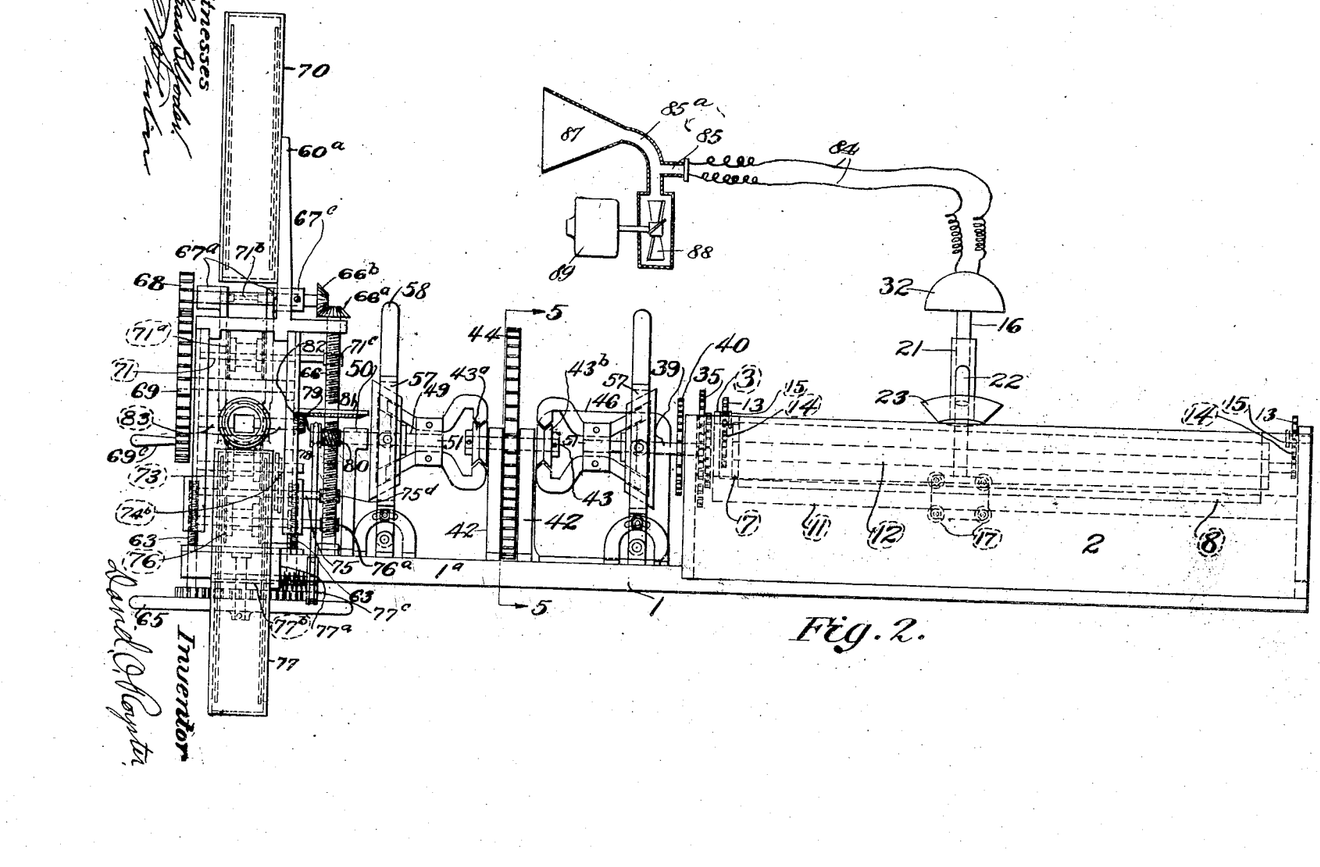
Fig. 2 is a front elevation of the apparatus.

The reproducer 23 is started at the left hand end of the record cylinder marked X in Fig. 1, and when so positioned one of the arms 28 engages on top of the corresponding end of the dog 19, thereby causing the toothed notch in this end to engage the threaded shaft 12 that is immediately adjacent to the cylinder X.

As this shaft rotates, the dog 19 and parts connected thereto are slowly moved lengthwise of the frame 2 by reason of the engagement of the dog with the threaded shaft. During such movement the tube 16 moves between the rails 11 with the rollers 17 riding thereon. The needle of the transmitter 23 follows the indentations in the surface of the record cylinder and the reproduced sounds pass into the tube 16 and pass therefrom into and through the horn under the influence of the fan 33.

When the moving parts comprising the reproducer 23, tube 16, dog 19 reach the right hand end of the record cylinder X, said parts are automatically shifted, so as to position the reproducer on the other one of the record cylinders and the dog is caused to engage with the opposite shaft 12, in the following manner:

As the reproducer 23 reaches the right hand end of the record cylinder X the right hand of the pin 30 moves into the path of travel of the arm 15 carried by the right hand one of the pinions 14. This arm engages against the underside of said pin and as the pinion 14 continues to rotate, said arm exerts a lifting pressure against the engaged pin. As a result the sleeve 21 and parts carried thereby are elevated, during which time the pin 27 travels through one of the vertical slots 25. During this movement the sleeve 21 cannot rotate but when the pin 27 reaches the upper end of the vertical slot the continued movement of the arm 15 bearing against the pin 30 tends to rotate the sleeve 21 and the pin 27 now passes into one of the curved grooves 26 and by gravity the reproducer 23 will swing around and downwardly to a position directly opposite the one in which it has been positioned, and thus the needle of said reproducer is brought into contact with the surface of the record cylinder Z at the right hand end thereof. During the downward swinging movement of the reproducer the pin 27 passes downward through one of the curved grooves 26. As the position of the reproducer is thus changed, one of the arms 28 leaves the end of the dog 19, and the opposite arm engages on the opposite end of said dog thus bringing the corresponding notched end into engagement with the threaded shaft 12 that is adjacent to the cylinder Z, and as said shaft continues to rotate the dog, together with the tube 16 and parts carried thereby are moved toward the left hand end of the machine.

While the reproducer is operating on the cylinder X, a record cylinder can be placed on the opposite cylinder Z and while said reproducer is traveling on the cylinder Z the cylinder X can be removed and replaced by a different record cylinder. When the reproducer reaches the left hand end of the cylinder Z, the pin 30 (which was shifted in position when the reproducer and carried parts were swung around) is engaged by the corresponding arm 15 and as a result the sleeve 21 and carried parts are elevated as hereinbefore described, and the reproducer is swung around onto the left hand of the record cylinder, which has been substituted for the cylinder X.

During the operation of the phonograph, as just described, the motion picture machine is synchronously operating as follows: The rotary motion of the motor shaft 43 is imparted to the shaft 49 by means of the intermediate clutch, and the worm 80 engaging the screw shaft 66 drives the same. The film carrying rollers 71 and 76 are simultaneously rotated by reason of the engagement of the worms $71^c$ and $76^a$ with the screw shaft 66.

Figures 11, 12:
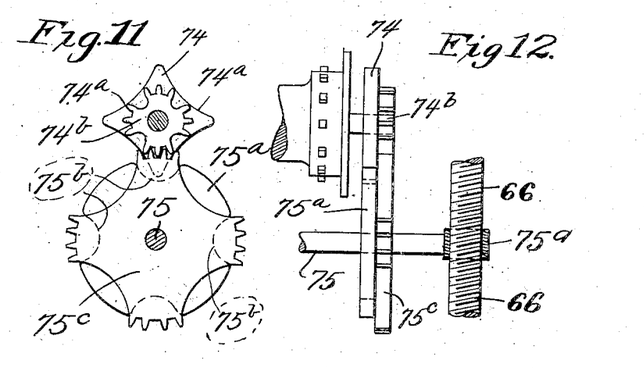
Fig. 11 is an elevation of an intermittent gearing utilized for moving the film from one reel to another, and which gearing is instrumental in imparting the necessary intermittent movement to said film.
Fig. 12 is an elevation of the gearing, seen in Fig. 11, and also showing adjacent parts of the mechanism of the motion picture machine.

The shaft $77^b$ carrying the reel onto which the film is rolled is driven by the belt 78 operating on the pulleys 79 and $77^c$. The latter is an ordinary form of slip pulley and compensates for the gradually increasing size of the roll of film onto the reel carried by the shaft $77^b$. The apertures of the film receive the projections on the rollers 71 and 76 and thus said film is gradually unwound from one reel and wound onto the other. The horizontally disposed loops $72^a$ and $76^b$ form sufficient lengths of film to permit the intermittent movement of the film as it passes between the light and the shutter in the rear end of the lens barrel 61. The intermittent movement for the film is brought about by the mechanism shown in Figs. 11 and 12 and operates as follows:

The worm $75^d$ engages with the shaft 66 and thus the shaft 75 is constantly driven. The teeth of the mutilated gear wheel $75^c$ mesh with the corresponding teeth of the mutilated pinion $74^b$, thereby intermittently driving said pinion, and during the time the teeth of these parts are not engaged, the periphery of the disk $75^a$ engages the surfaces of the concave notches $74^a$ of the disk 74, and during this latter engagement there is no movement imparted to the shaft on which the pinion $74^b$ is mounted. During the time the teeth of gear wheel $75^c$ are in engagement with the teeth of the pinion $74^b$, the points on the disk 74 between the notches $74^a$ enter the notches $75^b$ in the disk 75. Thus intermittent movement is imparted to the film carrying roller 73, and the film carried thereby is intermittently moved behind the shutter in the rear end of the lens barrel 61. It will be noted that this intermittent movement takes place between the horizontal loops $72^a$ and $76^b$ of the film. The shutter is operated from the beveled gear wheel 81 which meshes with the pinion 82.

When it is desired to adjust the film and film carrying rollers vertically with respect to the lens barrel and shutter, the hand wheel 65 is rotated, thereby rotating the screw rods $62^a$ by reason of the engagement of the gear wheel 64 with the pinions $63^a$, and as a result the plates 62 and carried parts are raised or lowered.

Thus the phonograph and motion picture machine are operated synchronously, and as the pictures appear in succession on the screen the proper sounds are produced by the phonograph.

When it is desired to cut out the motor, the hand lever 47 carrying the pinion 48 is actuated to disengage said pinion from the pinion 45 and gear wheel 44. When this is done the apparatus can be manually operated by locating the collar $67^c$ on the shaft 67 so that the pinion $66^b$ meshes with the pinion $66^a$ and actuating the gear wheel 69 by manually engaging the handle $69^c$.

By actuating the proper one of the hand levers 58 to release or unlock the corresponding clutch, either the phonograph or motion picture machine may be cut out, or rendered inoperative so that said machines can be operated independently when desired.

When it is desired to transmit the reproduced sounds to a point behind the screen on which the pictures are shown—the parts shown in Fig. 10 are located behind the screen and the wires 84 are led to the receiver 85. From this receiver the produced sound waves pass upward through the tube $85^a$ through the horn 87, and are thereby thrown directly against the screen on which the pictures are displayed.

The main portions of the film are maintained in the film housings, thereby materially reducing the danger of fire, and the wide flanges on the ends of the film carrying rollers, protect the edges of the film as it passes through the motion picture machine to the rear of the lens barrel.

It will be understood that an apparatus of my improved construction can be utilized for the synchronous production of a film and sound records, and where the apparatus is so used the motion picture machine and phonograph are simultaneously operated with a photographic lens in the lens barrel instead of a projecting lens, and with blank record cylinders on the members 7, and with a recording device in the place of the reproducer 23. Thus the same apparatus can be used for taking pictures and making sound records, which pictures and sound records are afterward placed in the apparatus and displayed and reproduced.

An apparatus of my improved construction is comparatively simple, can be operated with little power, can be easily adjusted, and provides simple means whereby a motion picture machine can be operated synchronously with a phonograph.

It will be readily understood that minor changes in the size, form and construction of the various parts of my improved apparatus can be made and substituted for those herein shown and described without departing from the spirit of my invention, the scope of which is set forth in the appended claims.

I claim—

1. In an apparatus for producing synchronism between motion pictures and a sound record, a motion picture machine, a phonograph having a pair of rotatably mounted cylinders arranged side by side, means for operating the motion picture machine and the phonograph simultaneously or independently, a tubular member mounted to move lengthwise between the phonograph cylinders, a reproducer connected to said tube, means for shifting said reproducer from one cylinder to the other when the tube reaches the ends of the cylinders, means for forcing sound waves through the tubular member, a telephone transmitter operatively connected to the tubular member, a horn located adjacent to the screen on which the motion pictures are shown, a telephone receiver connected to said horn, electrical connections between the telephone transmitter and the receiver, and means for forcing the sound waves from the receiver through the horn.

2. In an apparatus of the class dscribed, the combination with a motion picture machine, of a phonograph including a pair of sound records arranged side by side, a vertically disposed tube adapted to travel between said sound records, a reproducer attached to said tube and adapted to contact with the surfaces of the cylinders, means for shifting the reproducer from one cylinder to another when the tube has moved to the ends of the cylinders, means carried by the tube for forcing sound waves from the reproducer through said tubular member, and means for operating the motion picture machine and phonograph simultaneously or independently.

3. In an apparatus of the class described, the combination with a motion picture machine, of a phonograph including a pair of sound records arranged side by side, a vertically disposed tube adapted to travel between said sound records, a reproducer attached to said tube and adapted to contact with the surfaces of the cylinders, means for shifting the reproducer from one cylinder to another when the tube has moved to the ends of the cylinders, means carried by the tube for forcing sound waves from the reproducer through said tubular member, a telephone transmitter connected to the tube, an electric circuit in which said transmitter is located, a telephone receiver located in said circuit, and means for operating the motion picture machine and phonograph simultaneously or independently.

4. In an apparatus of the class described, a phonograph including a pair of record cylinders arranged side by side, a tube arranged between said cylinders, means for moving said tube from one end of the cylinders to the other, a sound reproducer connected to said tube and adapted to contact with the surfaces of the cylinders, means carried by said tube for forcing sound waves from the reproducer through said tube, and means for shifting the reproducer from one cylinder to the other at the ends of said cylinders.

5. In an apparatus of the class described, a phonograph including a pair of record cylinders arranged side by side, a tube arranged between said cylinders, means for moving said tube from one end of the cylinders to the other, a sound reproducer connected to said tube and adapted to contact with the surfaces of the cylinders, means carried by said tube for forcing sound waves from the reproducer through said tube, means for shifting the reproducer from one cylinder to the other at the ends of said cylinders, and means for electrically transmitting the reproduced sounds from the tube to a point remote from the phonograph.

In testimony whereof I hereunto affix my signature, in the presence of two witnesses, this eighth day of July, 1912.

DAVID O. ROYSTER.

Witnesses:
CHAS. B. YODER,
RUTH PETERSON.